United States Patent
Assmann et al.

(10) Patent No.: US 7,978,891 B2
(45) Date of Patent: Jul. 12, 2011

(54) METHOD AND PROCESSOR FOR GENERATING A MEDICAL IMAGE USING STORED PAN/ZOOM PREFERENCES

(75) Inventors: Stefan Assmann, Erlangen (DE); Okan Ekinci, Uttenreuth (DE)

(73) Assignee: Seimens Aktiengesellschaft, Munich (DE)

( * ) Notice: Subject to any disclaimer, the term of this patent is extended or adjusted under 35 U.S.C. 154(b) by 1007 days.

(21) Appl. No.: 11/835,487

(22) Filed: Aug. 8, 2007

(65) Prior Publication Data

US 2008/0037850 A1 Feb. 14, 2008

(30) Foreign Application Priority Data

Aug. 8, 2006 (DE) .................... 10 2006 037 063

(51) Int. Cl.
*G06K 9/00* (2006.01)

(52) U.S. Cl. .................................................. 382/128

(58) Field of Classification Search .................. None
See application file for complete search history.

(56) References Cited

U.S. PATENT DOCUMENTS

| | | | |
|---|---|---|---|
| 5,187,776 A | | 2/1993 | Yanker |
| 5,552,605 A * | | 9/1996 | Arata ..................... 250/363.04 |
| 7,738,684 B2 * | | 6/2010 | Kariathungal et al. ....... 382/128 |
| 2003/0200119 A1 * | | 10/2003 | Lewis et al. ........................ 705/2 |
| 2003/0215120 A1 | | 11/2003 | Uppaluri et al. |
| 2004/0068167 A1 | | 4/2004 | Hsieh et al. |
| 2004/0169668 A1 | | 9/2004 | Yamada et al. |
| 2005/0102315 A1 * | | 5/2005 | Krishnan ..................... 707/102 |
| 2005/0228250 A1 * | | 10/2005 | Bitter et al. ................... 600/407 |
| 2006/0133658 A1 | | 6/2006 | Spahn |
| 2006/0139318 A1 * | | 6/2006 | Kariathungal et al. ....... 345/156 |
| 2007/0025606 A1 * | | 2/2007 | Gholap et al. ................ 382/128 |
| 2007/0036405 A1 | | 2/2007 | Lienard et al. |
| 2007/0154075 A1 * | | 7/2007 | Matsumoto ................... 382/128 |
| 2007/0274587 A1 | | 11/2007 | Eronen |
| 2008/0037850 A1 * | | 2/2008 | Assmann et al. ............. 382/131 |

* cited by examiner

*Primary Examiner* — Bhavesh M Mehta
*Assistant Examiner* — Tahmina Ansari
(74) *Attorney, Agent, or Firm* — Schiff Hardin LLP

(57) ABSTRACT

In a method for generation of a medical image, starting from an acquired data set of an organ to be depicted, a magnification factor and/or an image section to be depicted are automatically determined dependent on the organ to be depicted. Based on this a medical image is generated from the data set. A data processing unit for medical images is fashioned for implementation of such a method and computer software implements such a method when it is executed on a data processing unit.

10 Claims, 4 Drawing Sheets

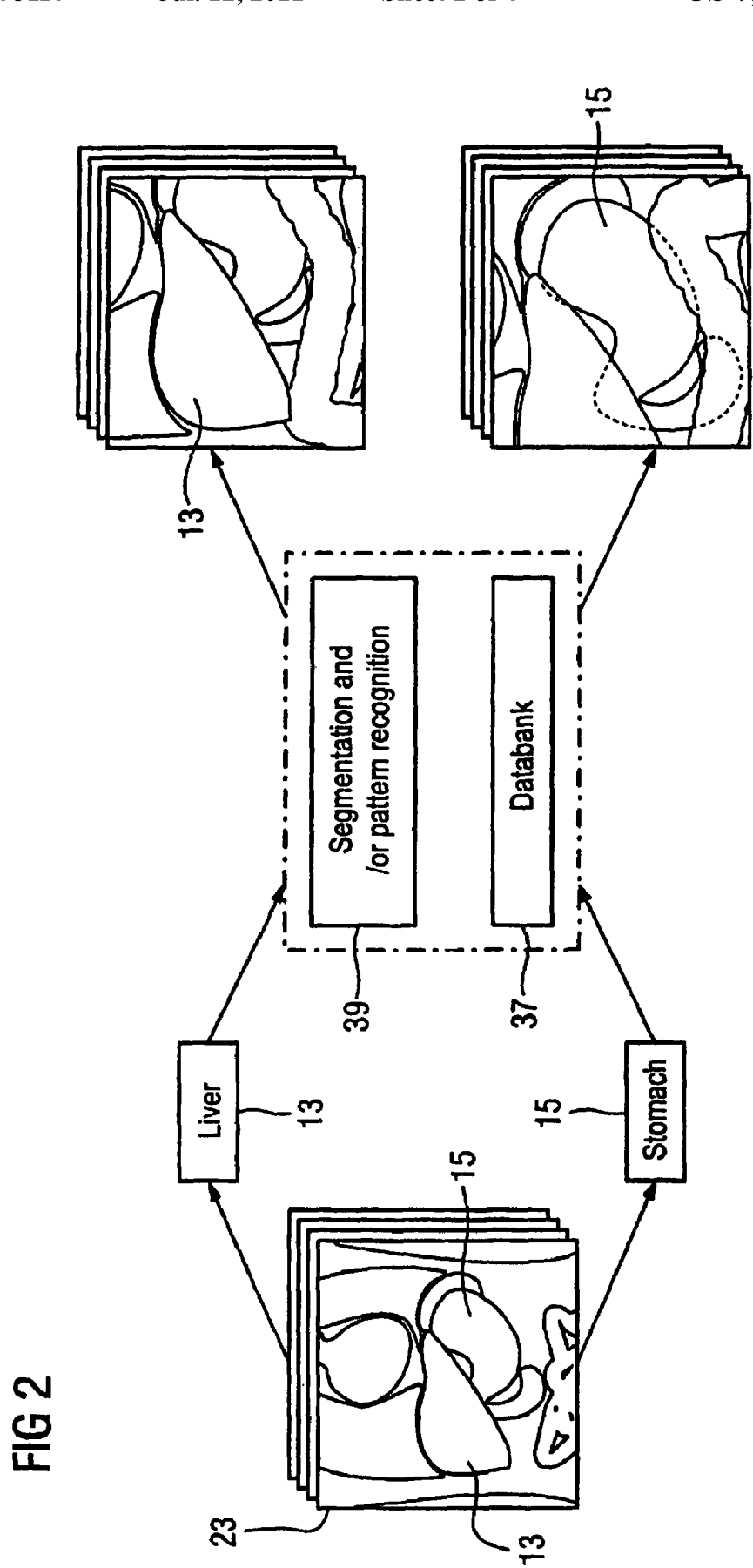

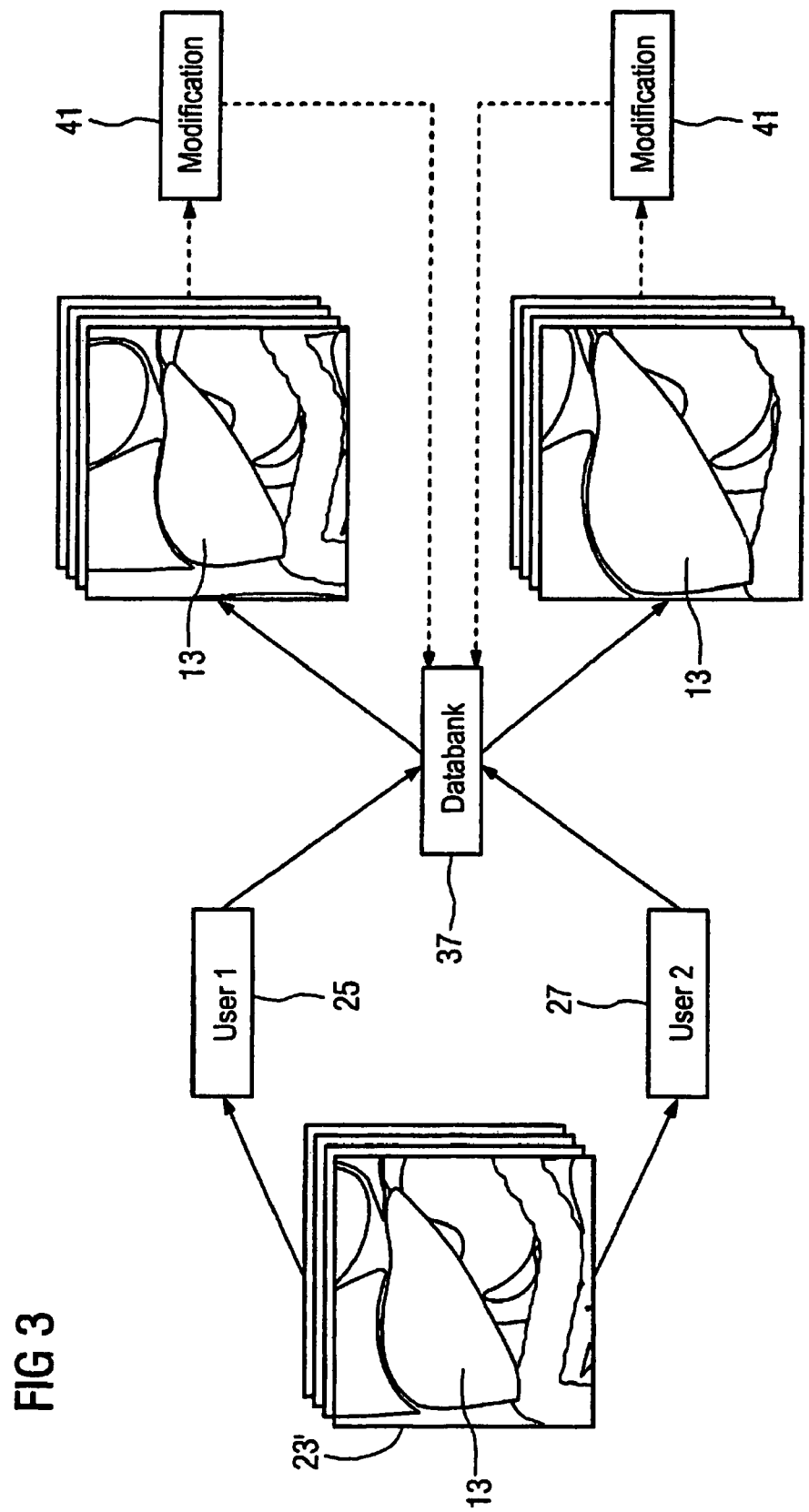

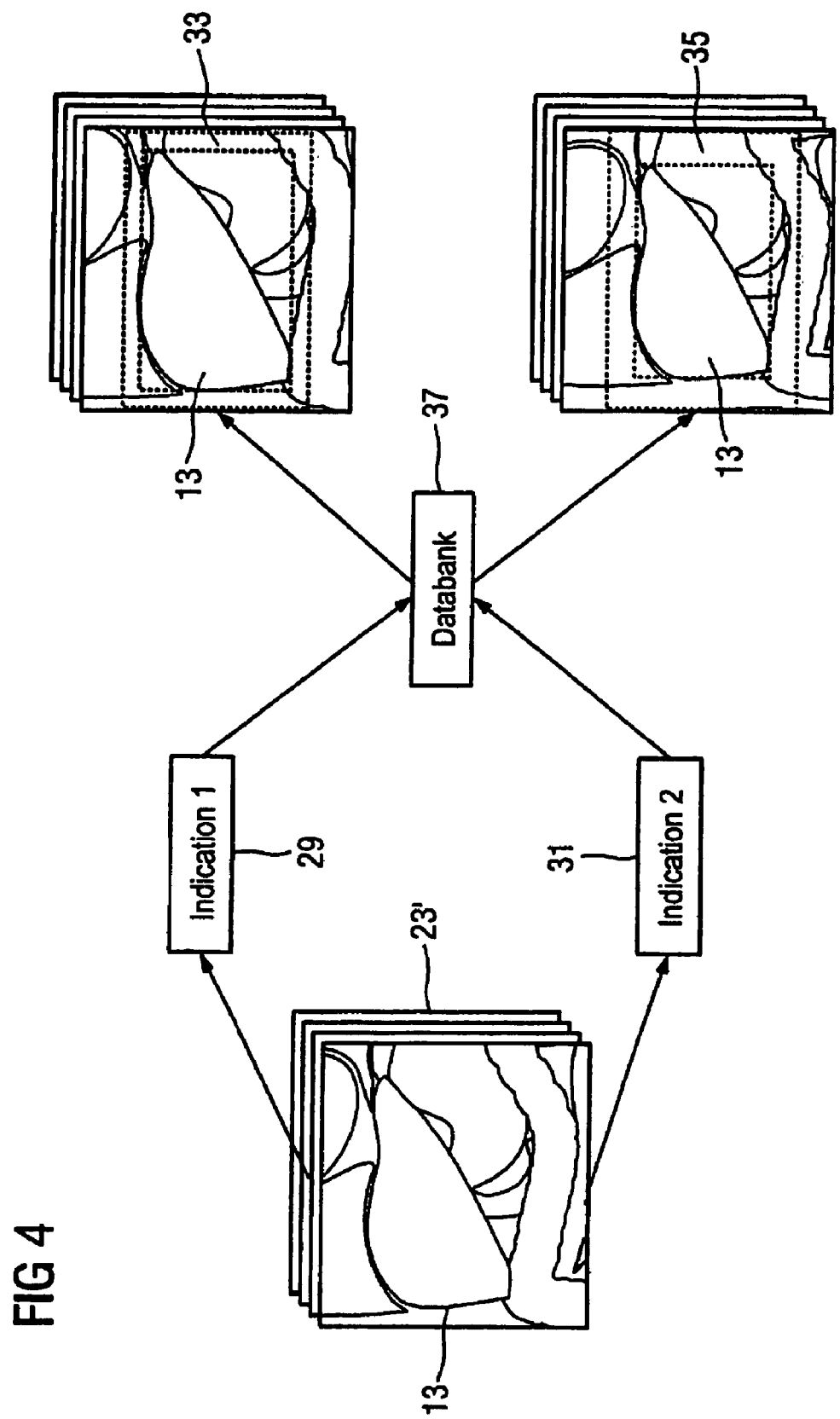

METHOD AND PROCESSOR FOR GENERATING A MEDICAL IMAGE USING STORED PAN/ZOOM PREFERENCES

BACKGROUND OF THE INVENTION

1. Field of the Invention

The invention concerns a method for generation of a medical image, as well as a data processing unit and computer software for this purpose.

2. Description of the Prior Art

In the examination of medical images a user (for example, a physician) must often review and assess many images in the shortest possible time. A user thus will typically predominately direct his or her attention to an organ for which assessment is of central importance for evaluation of a medical question. Since the relevant medical information is often found in small regions of the medical image and since the medical images today for the most part exist digitally, a user will look at corresponding image sections in an enlarged view for better assessment of this information. If a user must sequentially consider many medical images (as is the case, for example, for digital slice image data sets that have been acquired with by computed tomography or magnetic resonance tomography), the steady re-selection of the matching image section can be a burden for a user and lead to a significant temporal delay in the assessment.

SUMMARY OF THE INVENTION

An object of the present invention is to provide a method for generation of a medical image that supports a user in an effective manner in the assessment and evaluation. Furthermore, it is an object of the invention to provide a data processing unit and computer software for displaying medical images with which a user is supported in an effective manner in the assessment and evaluation of medical images.

In the inventive method for generation of a medical image, starting from an acquired data set of an organ to be depicted, a magnification factor and/or an image section to be depicted is automatically determined dependent on the organ to be depicted, and based on this a medical image is generated from the data set. The magnification factor and/or the image section to be depicted are additionally selected dependent on the preference of a user.

A user who evaluates the generated medical image is assisted since the user no longer has to enlarge the image regions of interest himself or herself; rather, organ-dependent, automatically running zoom movements are provided to the user according the method. The method can be individually adapted to various users, thus increasing the flexibility of the method. In particular, the preference of a user can be stored in a data processing unit on which, for example, the method is executed.

Automatic determination of the magnification factor can ensure in an embodiment of the method. When, for example, the a computed tomography scan of the thorax has been produced for examination of the heart, the magnification factor can be determined so that the heart sufficiently fills the image region of the medical image. In the event that the heart is not located in the image region in the depiction, a user will merely appropriately remove (defer) the medical image without having to manually adjust the enlargement.

When the image section to be depicted is automatically determined dependent on the organ to be depicted, even this step is omitted for a user, since both the magnification factor and the position of the image section to be depicted are automatically established in the medical image.

After selection of the magnification factor and/or the image section to be depicted, a medical image based on this is generated from the data set. This can be achieved in various ways. In a simple embodiment, an image that exhibits or renders the magnification factor and/or the image section to be depicted is generated and shown to a user. In other variants, further processing steps are implemented before and/or after selection of the magnification factor and/or selection of the image section to be depicted, and the medical image is generated after execution of the further processing steps.

In a preferred embodiment the magnification factor and/or the image section to be depicted are determined using data stored in a databank.

This embodiments represents a simple possibility to automatically determine the magnification factor and/or the image section to be depicted. For example, if the position of an organ in a body to be depicted is largely constant apart from inter-individual differences, the position of the organ in the acquired data set is also approximately known in advance for a specific examination, such as, for example, the position of the heart in a computed tomography scan of the thorax. In this embodiment, data that describe the position in the data set of the organ to be depicted are stored in a databank so that the matching magnification factor and/or the image section to be depicted are determined therefrom.

In a preferred embodiment the magnification factor and/or the image section to be depicted are determined using a segmentation algorithm and/or pattern recognition algorithm.

In this embodiment the acquired data set can be initially roughly pre-segmented so that the orientation and the position of individual organs in the data set are largely known in advance. Known segmentation algorithms can be used for this purpose. Instead of a segmentation of the data set with segmentation algorithms, a pattern recognition algorithm can be used with which the orientation and the position of the organ to be depicted are detected based on intensity values and intensity value modulations that are typical for the organ in question. The magnification factor and/or the image section to be depicted are established based on the data acquired in this manner.

The embodiment in which a segmentation and/or pattern recognition algorithm is used can also be combined with the embodiment that determines the magnification factor and/or the image section to be depicted using data stored in a databank. For example, it is possible for the organ to be depicted to be initially pre-segmented so that the orientation and extent of the organ to be depicted is known in advance and so that data stored in a databank and regarding the organ to be depicted are retrieved, and the magnification factor and/or the image section to be depicted are determined from these. For example, the data stored in the databank can include information about the percentage of the image region that should be occupied by the organ to be depicted. The precision and flexibility of the method in the generation of a medical image are thereby increased.

The magnification factor and/or the image section to be depicted are preferably depicted such that the organ to be depicted is shown together with a predefined region surrounding the organ to be depicted.

By the predetermination of a predefined region surrounding the organ to be depicted, this region being taken into account in the selection of the magnification factor and/or of the image section to be depicted, it is ensured that the organ is entirely visible in the generated medical image along with a region surrounding the organ, this region typically depicting adjoining organs and adjoining tissue. The assessment of the organ to be depicted is hereby simplified, since now the organ to be depicted can be assessed in relation to its immediate neighboring organs.

In the event that the organ is only partially visible after selection of the magnification factor and/or of the image section, the shown image region is advantageously presented such that it can be shifted.

This ensures that the entire information of the acquired data set is also available to a user even when the medical image only shows a section thereof. This is particularly advantageous when the organ to be depicted is only partially visible due to the predefined magnification factor, since now the user can assess the entire organ by displacement of the shown image region. The displacement of the image section can occur similarly to what is known as a pan function, by a window section being shown that can be horizontally and vertically displaced with direction keys.

The image section of the medical image can always be shown such that it can be displaced when it does not show the entire information stored in the data set.

The magnification factor and/or the image section to be depicted are additionally advantageously selected dependent on an examination indication.

Since examination indications typically are stored together with the acquisition of a data set, in this embodiment this can be taken into account so that the generated medical image considers special requirements that are posed by the examination indication. The user is thereby further unburdened and the method further adapts to the requirements of the assessment given specific examination indications.

The preference of the user can be modified by a manual modification of the magnification factor and/or of the image section to be depicted being stored by the user.

This embodiment allows an automatic adaptation to as well as learning of the user preferences that do not have to be independently entered. Instead they are learned during the assessment of already-produced data sets, by an alteration by the user of the magnification factor and/or of the image section to be depicted being stored and being taken into account in the next implementation of the method.

After automatic selection of the magnification factor and/ or of the image section to be depicted, the magnification factor and/or the image section to be depicted is advantageously used in at least one further image processing step.

The magnification factor and/or the image section to be depicted are thus also used in further image processing steps. For example, a segmentation algorithm that is based on the magnification factor and/or the image section to be depicted can be executed more simply and more precisely, because superfluous image information that would interfere in the segmentation can be masked out. The precision of continuative image processing steps thereby increases.

BRIEF DESCRIPTION OF THE DRAWINGS

FIG. 2 illustrates an embodiment of the method in which a magnification factor and/or an image section to be depicted are selected dependent on the organ to be depicted for the presentation of a medical image.
FIG. 3 illustrates an embodiment of the method in which the preference of a user is taken into account in the presentation of the organ to be depicted.
FIG. 4 illustrates an embodiment of the method in which the presentation of the organ to be depicted ensues dependent on an examination indication.

DESCRIPTION OF THE PREFERRED EMBODIMENTS

Figure 1:
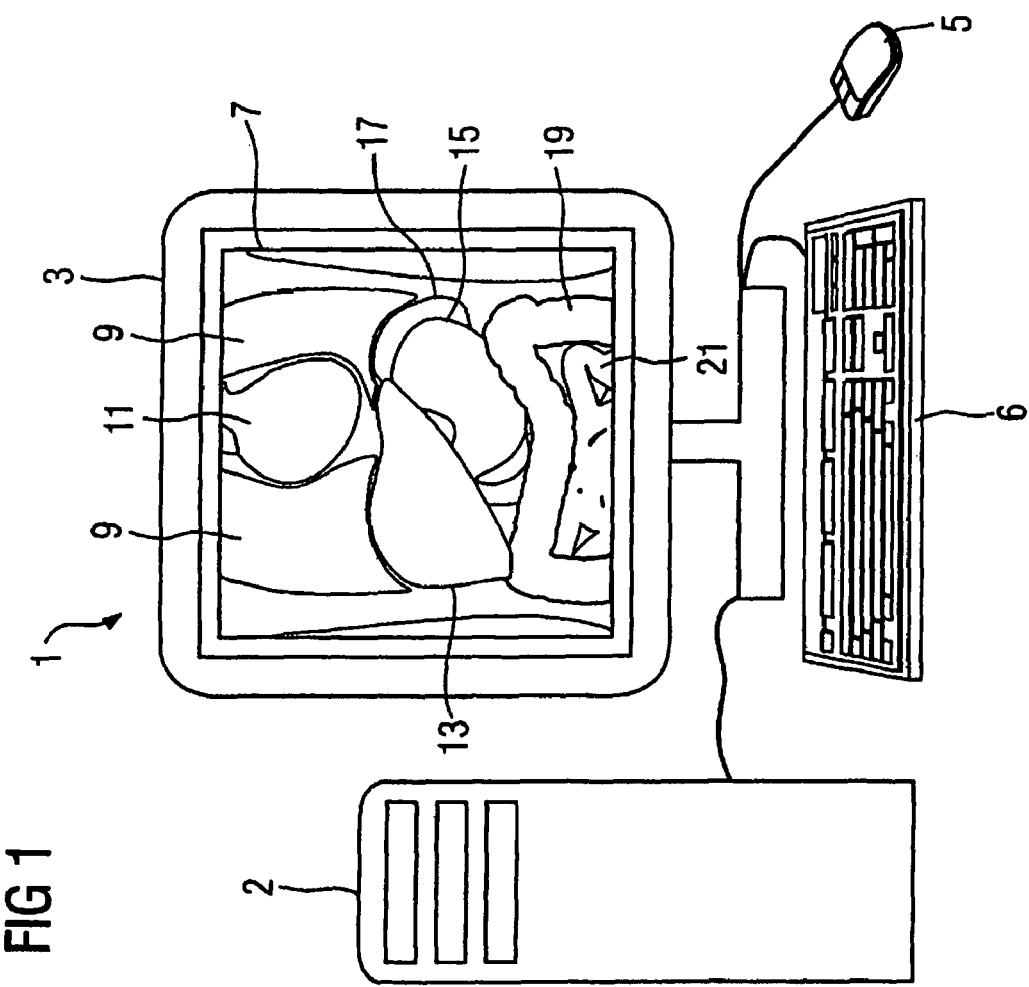
FIG. 1 shows a presentation unit for medical images with a computer.

FIG. 1 shows a presentation unit 1 for medical images. Such a presentation unit 1 typically includes a monitor 3 with which medical images are shown to a user as well as input means (for example a keyboard 6 or a mouse 5) with which a user can vary the presentation of a medical image and adjust it according to his wishes. The presentation unit 1 is connected with a computer 2 that includes means for administration of or for connecting to a databank so that acquired data sets as well as information linked therewith (such as, for example, examination indications, patient data, acquisition modalities) can be loaded or stored and means for processing of the data so that embodiments of the inventive method as they are subsequently described can be executed.

As an example and for explaining the inventive method, a frontal section 7 through an epigastrium of a patient to be examined is shown to a user with the aid of the presentation unit 1. Such a frontal section 7 can be acquired, for example, with a computed tomography apparatus or a magnetic resonance apparatus in the framework of a slice image examination. Slice image examinations of the gastrointestinal tract are used for examination of various organs of the gastrointestinal tract for a wide variety of indications. As also shown in FIG. 1, in a slice image examination of the epigastrium the organs of the gastrointestinal tract (such as the liver 13, the stomach 15 or the spleen 17) are typically entirely acquired while adjoining organs (such as, for example, both lobes of the lungs 9, the heart 11 as well as the large intestine 19 and the small intestine 21) are shown truncated. When a user wants to view such images, he or she will view different regions of the shown medical image with different magnification depending on the organ to be examined, the examination indications, and/or individual presentation desires. If a user must manually adjust the region to be depicted and/or the magnification factor every time, the user can sometimes be significantly hindered in the viewing of the medical images since his or her manual interventions can represent a significant time loss, in particular when viewing many images.

As is explained in detail using subsequent figures, a user is significantly supported by the inventive method and the inventive presentation unit 1 in the assessment of medical images.

FIG. 2 shows a slice image data set 23 of the gastrointestinal tract. When the slice image data set 23 of the gastrointestinal tract has been acquired for examination of the liver 13, this is automatically taken into account in the presentation of the slice image data set so that the magnification factor and/or the image section to be depicted are selected such that the liver 13 is shown clearly visible to a user while surrounding organs that play a subordinate role in the assessment of the liver are not necessarily shown as well. In this way a user can direct his or her attention entirely to the liver 13 from the beginning without having to intervene.

In another case—when, for example, the stomach 15 is the organ to be examined that has been acquired with the slice image data set 23—a corresponding different magnification factor and/or image section to be depicted are selected.

The automatic selection of the magnification factor and/or of the image section to be depicted can ensue by the corresponding values being stored in a databank 37 (such as, for example, a predefined representation size of the organ that is to be reached, or the bearing and the position of the organ in a standard patient and in the corresponding examination) and are retrieved as needed.

Pattern recognition and/or segmentation algorithms 39 also can be used—possibly in addition to the data stored in a databank 37—so that an organ is automatically localized in the image data set and the matching magnification factor and/or the matching image section are determined based on this localization.

Which organ is situated in the center of the examination, based on which the magnification factor and/or the image section to be depicted are automatically selected, can be determined in various ways. A simple possibility is to automatically determine the organ situated in the center of the region of interest from the examination indication that has led to production of the image and that is typically stored in a databank 37 and linked with the associated image. When, for example, the examination indication was a question about a metastasis of a tumor in the liver, the liver can automatically be determined as the organ to be examined, to which the selection of the magnification factor and/or of the image section to be depicted conform. It is also possible for the user to select the organ to be assessed in that, for example, the user clicks on a corresponding pictogram, selects the organ from a list or clicks on the corresponding organ in a pre-segmented data set and therewith indicates on the basis of which organ the magnification factor and/or the image section to be depicted are selected. Although an interaction with a user is thereby required, this interaction is significantly less complicated than a manual adjustment of the magnification factor and/or of the image section to be depicted.

The magnification factor and/or image section to be depicted in FIG. 2 do not necessarily have to be used for the generation of a medical image that is thereupon shown to a user with the corresponding magnification factor and/or image section to be depicted. It is likewise possible to use the magnification factor and/or the image section to be depicted for further image processing steps, for example as an input for furthermore segmentation algorithms that are now to be implemented more precisely.

The organ-dependent magnification factor and/or image section to be depicted can be modified in various ways, as this is now explained using FIG. 3 and FIG. 4.

In the slice image data set 23' shown in FIG. 3 a magnification factor or an image section to be depicted has already been selected to show the liver 13. This magnification factor and/or image section to be depicted can now be modified dependent on the user. For example, the desire of a first user 25 in the assessment of the slice image data set 23 for examination of the liver 13 can be to preferably receive the liver 13 shown somewhat smaller in order to allow more of the surrounding organs to be seen. The desire of a second user 27 can be, for example, to have the liver 13 be shown as large as possible in order to detect as many details as possible. This can be taken into account, for example, in the representation of the slice data set 23 by storing the user-dependent presentation preferences in a databank 37 and to be retrieved corresponding to the identity of the user.

The user-dependent presentation preferences that, in a simple embodiment variant, are likewise stored in a databank 37 can be administered in a simple manner by, in the event that a user manually modifies the presentation preferences (manual modification 41), these manual modifications 41 dependent on the user being stored in the databank 37. In this manner the databank 37 learns the user-dependent presentation preferences in the presentation of various organs bit by bit so that a user must only manually input his presentation preferences when a new organ is presented whose presentation preferences have not yet been stored in the databank 37 or when the user desires a modification of the organ-related presentation preferences for the first time upon the presentation of an organ.

Shown in FIG. 4 is a slice image data set 23' for which presentation the magnification factor and the image section to be depicted for examination of the liver are selected. In the embodiment variant of the method described in FIG. 4, this magnification factor and the associated image section to be depicted are modified dependent on an examination indication. A first examination indication 29 can be, for example, an unclear intrahepatic finding of a preceding ultrasound examination of the liver. Since the unclear finding lies within the liver 13 given such an examination indication, the magnification factor and/or the image section to be depicted can be modified such that the liver 13 is presented together with a first region 33 surrounding the liver 13, with the first surrounding region 33 being selected relatively narrow due to the first examination indication 29.

Given a second examination indication 31 (for example given the question of a propagation of a liver carcinoma into surrounding tissue) the magnification factor and/or the image section to be depicted are modified such that a second region 35 surrounding the liver 13 is shown as well, with the second surrounding region 35 being distinctly larger than the first surrounding region 33 so that now a possible infiltration of the liver carcinoma into surrounding tissue can be presented better.

The indication-dependent modifications of the magnification factor and/or of the image section to be depicted can likewise be stored in a databank 37. Since the examination indications, underlying the production of the medical images are likewise typically stored in a databank 37 and are linked with the associated medical images, the items of information can be combined with one another in a simple manner so that the matching magnification factor and/or the image section to be depicted can be determined in a simple manner.

The selection of standard settings ensues for the case that no modification of the magnification factor and/or of the image section to be depicted are stored with regard to an examination indication.

Figure 5:
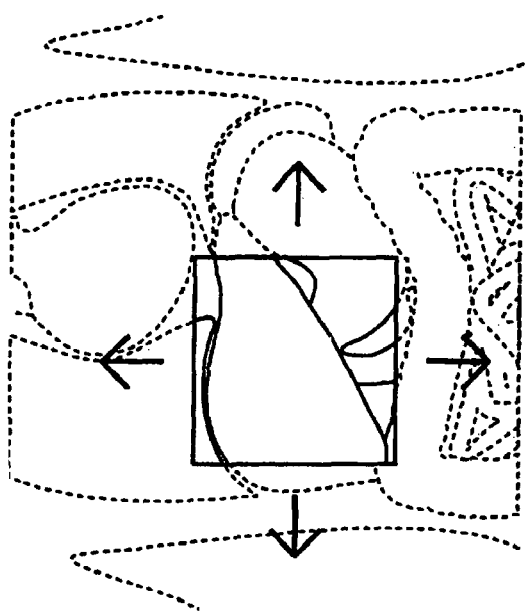
FIG. 5 illustrates an embodiment in which the shown section can be shifted.

FIG. 5 shows a preferred presentation variant that is preferably used when the magnification factor is selected such that the organ to be depicted is only partially visible (such as, for example, the liver 13 in FIG. 5). This can be the case, for example, when, due to a specific examination indication or a specific user preference, the magnification factor and/or the image section to be depicted are selected such that the organ is shown so large that it cannot be entirely shown in the medical image. In this case the image section to be depicted is shown to the user such that it can be displaced so that, by the displacement of the image section, a user can assess the entire organ to be depicted in spite of the large magnification factor.

Although modifications and changes may be suggested by those skilled in the art, it is the intention of the inventors to embody within the patent warranted hereon all changes and modifications as reasonably and properly come within the scope of his contribution to the art.

We claim as our invention:

1. A method for generating a medical image, comprising the steps of:
   providing a computerized processor, having a pan/zoom display function, with an acquired data set of anatomical organ to be depicted by implementing said pan/zoom display function with a pan/zoom display attribute selected from the group consisting of a magnification factor and an image section of the anatomical organ;
   storing a predetermined user preference for implementing said pan/zoom display function in a memory accessible by said computerized processor;
   in said processor, accessing said memory to retrieve said predetermined user preference from said memory, and automatically determining said display attribute dependent on said organ and dependent on said user preference; and
   from said processor, causing said data set of said anatomical organ to be visually displayed by implementing said pan/zoom display function in a display presentation embodying said automatically determined display attribute.

2. A method as claimed in claim 1 comprising storing in a databank accessible by said data processor, respective associations of pan/zoom different display attributes with different anatomical organs, and automatically determining said display attribute in said data processor by selecting the pan/zoom display attribute associated in said databank with the anatomical organ in said data set.

3. A method as claimed in claim 1 comprising automatically determining said pan/zoom display attribute in said data processor by operating on said data set with an algorithm selected from the group consisting of segmentation algorithms and pattern recognition algorithms.

4. A method as claimed in claim 1 comprising, in said data processor, automatically determining said pan/zoom display attribute to cause the anatomical organ to be depicted in said presentation together with a pre-determined region surrounding the anatomical organ.

5. A method as claimed in claim 1 comprising, in said data processor, automatically determining if said anatomical organ is only partially visible in said presentation and, if so, automatically causing said presentation to be displayed in a format allowing said presentation to be shifted.

6. A method as claimed in claim 1 comprising making an examination indication available to said data processor, and automatically determining said pan/zoom display attribute in said data processor dependent on said anatomical organ, said predetermined user preference, and said examination indication.

7. A method as claimed in claim 1 comprising allowing manual modification by a user of said predetermined user preference after retrieval thereof.

8. A method as claimed in claim 1 comprising, after displaying said presentation, executing a further image processing step in said data processor based on said presentation embodying the automatically determined pan/zoom display attribute.

9. A computerized system for generating a medical image, comprising:
   a computerized processor configured to implement a pan/zoom display function, and having an input supplied with an acquired data set of anatomical organ to be depicted by implementing said pan/zoom display function with a pan/zoom display attribute selected from the group consisting of a magnification factor and an image section of the anatomical organ;
   a memory accessible by said computerized processor in which a predetermined user preference for implementing said pan/zoom display function is stored;
   said processor being configured to access said memory to retrieve said predetermined user preference from said memory, and to automatically determine said display attribute dependent on said organ and dependent on said user preference; and
   a display monitor operates by said processor, at which said processor causes said data set of said anatomical organ to be visually displayed by implementing said pan/zoom display function in a display presentation embodying said automatically determined display attribute.

10. A non-transitory computer-readable storage medium encoded with programming instructions, said medium being loadable into a computerized processor configured to implement a pan pan/zoom function and having access to a memory in which a predetermined user preference for implementing said pan/zoom display function is stored, said programming instructions causing said computerized processor to:
    receive an acquired data set of anatomical organ to be depicted by implementing said pan/zoom display function with a pan/zoom display attribute selected from the group consisting of a magnification factor and an image section of the anatomical organ;
    access said memory to retrieve said predetermined user preference from said memory, and automatically determine said display attribute dependent on said organ and dependent on said user preference; and
    cause said data set of said anatomical organ to be visually displayed by implementing said pan/zoom display function in a display presentation embodying said automatically determined display attribute.

* * * * *